Jan. 14, 1964     T. E. HOY     3,117,450

THERMOMETER PACIFIER

Filed Jan. 31, 1961

INVENTOR
THOMAS E. HOY

BY *Fisher, Christen & Goodson*

ATTORNEYS

United States Patent Office 3,117,450
Patented Jan. 14, 1964

3,117,450
THERMOMETER PACIFIER
Thomas E. Hoy, 200 W. Washington St.,
Winnsboro, S.C.
Filed Jan. 31, 1961, Ser. No. 86,194
1 Claim. (Cl. 73—374)

This invention relates to a device for obtaining the temperature of small children and in particular to a mercury thermometer so associated with a pacifier-shaped device that the temperature of the child may be taken without difficulty.

One of the difficulties encountered by pediatricians and parents, when babies or other children of an early age become ill, is to determine the accurate temperature of the child. As is well known, most children refuse to accept an unfamiliar object in their mouths for the required amount of time for proper functioning of an instrument such as a thermometer. Rectal thermometers have not gained wide acceptance and are often times not desirable nor available. Therefore, it is the primary objective of this invention to provide a means by which the natural desire of the child to have a nipple in his mouth is utilized to obtain its oral temperature.

A further objective of this invention is the provision of a temperature-taking device wherein a metal plate is associated with a resilient pacifier in a manner that the temperature of a child using the pacifier will be readily transmitted to the thermometer tube.

A further objective of the invention is providing a device of the character described with a structure by which the thermometer may be easily removed from a worn pacifier and used with other pacifiers or by itself as desired.

A still further objective of this invention is the provision of apparatus to support a thermometer in a pacifier-like object so that it may be readily removed, checked and reinserted while the pacifier remains in the child's mouth.

These and other objectives and advantages of the invention will become more readily apparent upon a reading of the detailed description below taken in view with the drawings, in which.

Figure 1:
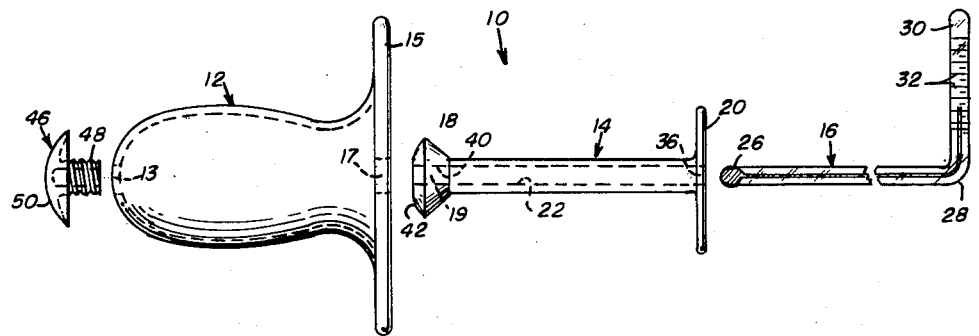
FIG. 1 is an exploded elevational view of one embodiment of this invention.
Figures 2, 3:
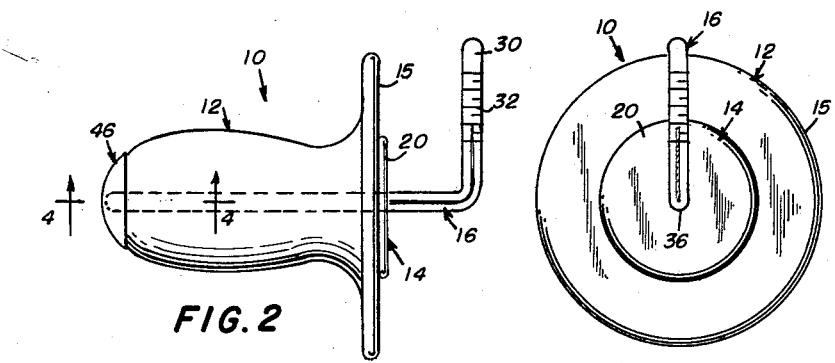
FIG. 2 is an assembled view.
FIG. 3 is an end view of FIG. 2.
Figure 4:
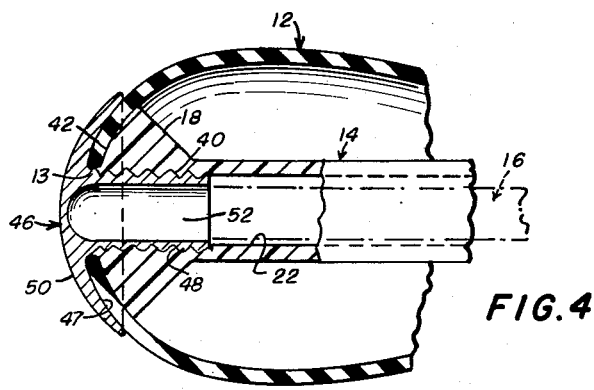
FIG. 4 is a cross-sectional view along the line 4—4 of FIG. 2.

Referring now to the drawings wherein like numerals indicate like parts, the numeral 10 indicates the mechanism of this invention. The invention is comprised basically of a hollow bulbous portion 12, in the shape of conventional nursing nipple, a framing tube 14 and a thermometer 16. The bulbous portion is provided with an aperture 13 at its outer end and at the base end thereof is provided with an enlarged base flange 15 having a central opening 17.

In the normal fashion, the bulbous portion is adapted to be placed in the child's mouth, with the base flange 15 resting against the lips so that the pacifier cannot be swallowed.

Adapted for insertion within the interior of the bulbous portion or nipple is the plastic framing tube 14 which is terminated at its forward end by an enlarged portion 18, and terminated at its other end by an annular flange 20. A bore 22 extends throughout the longitudinal length of tubular member 14 and is terminated by opening 36.

The thermometer 16 is L-shaped, and bent at 28 so the legs thereof are perpendicular to each other. Thus there is formed a first shank 25 terminated by a sensing bulb 26 and a shank 30 which is scored with indicia marks 32.

The base flange 20 of the member 14 has a central aperture 36 axially aligned with the aperture 13 in the bulbous portion. This flange or disc 34 is normally integral and of the same material as the member 14.

The enlarged portion 18 is interiorly threaded at 40 and is curved at 42 to substantially mate with the interior curves of the bulbous portion. Since flange 15 is of the same resilient material as portion 12, the opening 17 will accept the enlarged portion 18 therethrough.

A metallic dome-shaped cap 46 has a screw 48 extending therefrom, which is exteriorly threaded to be received by threads 40 of tube 14. The cap is mushroom-shaped having an outer surface 50 and an under surface 47 formed to substantially mate with the pacifier. It should be noted that the exterior surface 50 is formed with a slightly greater curve than the interior surface 47 which results in the metal cap gradually tapering into a mating plane with the curves of the pacifier.

The screw 48 has an elongated recess 52 adapted to receive the bulb 26 when the instrument is assembled.

In operation, the tubular support 14 is inserted into the interior of the pacifier 12. The enlarged portion 18 is positioned snugly against the end of the pacifier and cap 46 is attached to the frame via threads 40. In this position, it should be noted that the annular stop flange 20 is snugly against the disc 34 and the surface 46 and cap 40 secure the outer end of the pacifier between them. The shank 25 of the thermometer is inserted through channel 22 and pressed forward until the bulb 26 is lodged in the elongated recess 52. The stop flange 20 will prevent any damage to the bulb 26 by too much force being applied. The thermometer and recess 52 are so dimensioned that a snug fit is provided. The instrument is then placed in the child's mouth. After several minutes, due to the ready conduction of heat from the interior of the mouth to the thermometer, through metallic cap 46, the child's temperature will be indicated on indicia 32.

The L-shaped design of thermometer 16 is both convenient to read and aids in providing an area upon which to press when inserting shank 25 into the pacifier assembly. It can be readily seen that the tubular frame provides a convenient longitudinal guide support for the thermometer. The channel 22 guides the bulb of the thermometer to the recess 52 without any skill on the part of the user. This permits easy checking and reinsertion of the thermometer when desired.

In a general manner, while there has been disclosed in the above description, what is deemed to be the most practical and efficient embodiment of the invention, it should be well understood that the invention is not limited to such embodiment as there might be changes made in the arrangement, disposition and form of the parts without departing from the principle of the present invention as comprehended within the scope of the accompanying claim.

I claim:

A temperature-taking device comprised of a hollow bulbous portion of yieldable thin-walled material, a flanged portion for resting against the lips when said bulbous portion is in a child's mouth, said bulbous portion having an aperture therethrough, said flange having an aperture coaxial with said first-mentioned aperture, an elongated tube extending into said bulbous portion through said aperture in said flange having one end against said aperture in said bulbous portion, said one end of the tube is provided with an enlarged portion having a curved surface conforming to the inner surface of the bulbous portion, a heat-conducting cap having a curved flange fitting closely against the exterior of said bulbous portion, a shank extending from said cap through said aperture in the bulbous portion and secured to said tube, said shank and said tube are provided with mating threaded portions for interengagement, said shank having a recess in communication with the interior of said tube, an elongated thermometer extending through said tube having one end residing in said recess and having an indicia end extending to a point without said bulbous portion.

References Cited in the file of this patent

UNITED STATES PATENTS

| | | |
|---|---|---|
| 2,651,202 | Burns | Sept. 8, 1953 |
| 2,866,338 | Muncheryan | Dec. 30, 1958 |

FOREIGN PATENTS

| | | |
|---|---|---|
| 227,569 | Great Britain | Jan. 22, 1925 |